(12) United States Patent
Sun et al.

(10) Patent No.: US 12,437,380 B2
(45) Date of Patent: Oct. 7, 2025

(54) INFORMATION PROCESSING DEVICE AND INFORMATION PROCESSING METHOD

(71) Applicant: SONY GROUP CORPORATION, Tokyo (JP)

(72) Inventors: Legong Sun, Tokyo (JP); Yasutaka Hirasawa, Tokyo (JP); Yuhi Kondo, Tokyo (JP); Taishi Ono, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 408 days.

(21) Appl. No.: 17/922,579

(22) PCT Filed: Mar. 30, 2021

(86) PCT No.: PCT/JP2021/013540
§ 371 (c)(1),
(2) Date: Oct. 31, 2022

(87) PCT Pub. No.: WO2021/229943
PCT Pub. Date: Nov. 18, 2021

(65) Prior Publication Data
US 2023/0196534 A1    Jun. 22, 2023

(30) Foreign Application Priority Data
May 14, 2020 (JP) ................ 2020-085004

(51) Int. Cl.
*G06T 7/00* (2017.01)
*G06T 7/80* (2017.01)
*G06T 7/90* (2017.01)

(52) U.S. Cl.
CPC ............. *G06T 7/0002* (2013.01); *G06T 7/80* (2017.01); *G06T 7/90* (2017.01); *G06T 2207/10024* (2013.01); *G06T 2207/30168* (2013.01)

(58) Field of Classification Search
CPC .......... G06T 7/0002; G06T 7/80; G06T 7/90; G06T 2207/10024; G06T 2207/30168; G01N 21/88
(Continued)

(56) References Cited

U.S. PATENT DOCUMENTS 9,001,326 B2 *   4/2015   Goldfain ............... G01J 3/0224
                                                        356/368
2009/0135183 A1 *  5/2009  Sato ........................ G06T 7/11
                                                        345/426
(Continued)

FOREIGN PATENT DOCUMENTS

JP    2001-264037 A    9/2001
JP    2007-064888 A    3/2007
(Continued)

OTHER PUBLICATIONS

International Search Report and Written Opinion of PCT Application No. PCT/JP2021/013540, issued on Jun. 22, 2021, 10 pages of ISRWO.

*Primary Examiner* — Ali Bayat
(74) *Attorney, Agent, or Firm* — CHIP LAW GROUP

(57) ABSTRACT

Provided is a polarization rendering setting unit that sets a plurality of parameters to be used for generating a polarized rendered image of an abnormality detection target. A polarized rendered image generation unit generates the polarized rendered image of the abnormality detection target on the basis of the parameters set by the polarization rendering setting unit. An abnormality detection unit detects an abnormal region of the abnormality detection target on the basis of a difference between a polarized captured image acquired by imaging the abnormality detection target and the polarized rendered image generated by the polarized rendered image generation unit. Abnormalities that are difficult to
(Continued)

detect on the basis of luminance information and color information becomes able to be detected on the basis of polarized images.

12 Claims, 12 Drawing Sheets

(58) Field of Classification Search
USPC .......................................................... 382/162
See application file for complete search history.

(56) References Cited

U.S. PATENT DOCUMENTS

| 2017/0074806 A1* | 3/2017 | Seo ........................ G01N 21/21 |
| 2018/0128736 A1* | 5/2018 | Kanamori ............... G01N 21/21 |
| 2019/0004350 A1* | 1/2019 | Sahlsten ............ G02B 27/0172 |
| 2019/0336003 A1* | 11/2019 | Patwardhan ............ G06T 7/174 |
| 2020/0175297 A1* | 6/2020 | Ogasawara ............. G06T 7/521 |

FOREIGN PATENT DOCUMENTS

| JP | 2008-131176 A | 6/2008 |
| JP | 2011-150689 A | 8/2011 |
| JP | 2013-211740 A | 10/2013 |
| JP | 2016-166842 A | 9/2016 |
| JP | 2017-058383 A | 3/2017 |
| WO | 2019/003383 A1 | 1/2019 |
| WO | 2020/049816 A1 | 3/2020 |

* cited by examiner

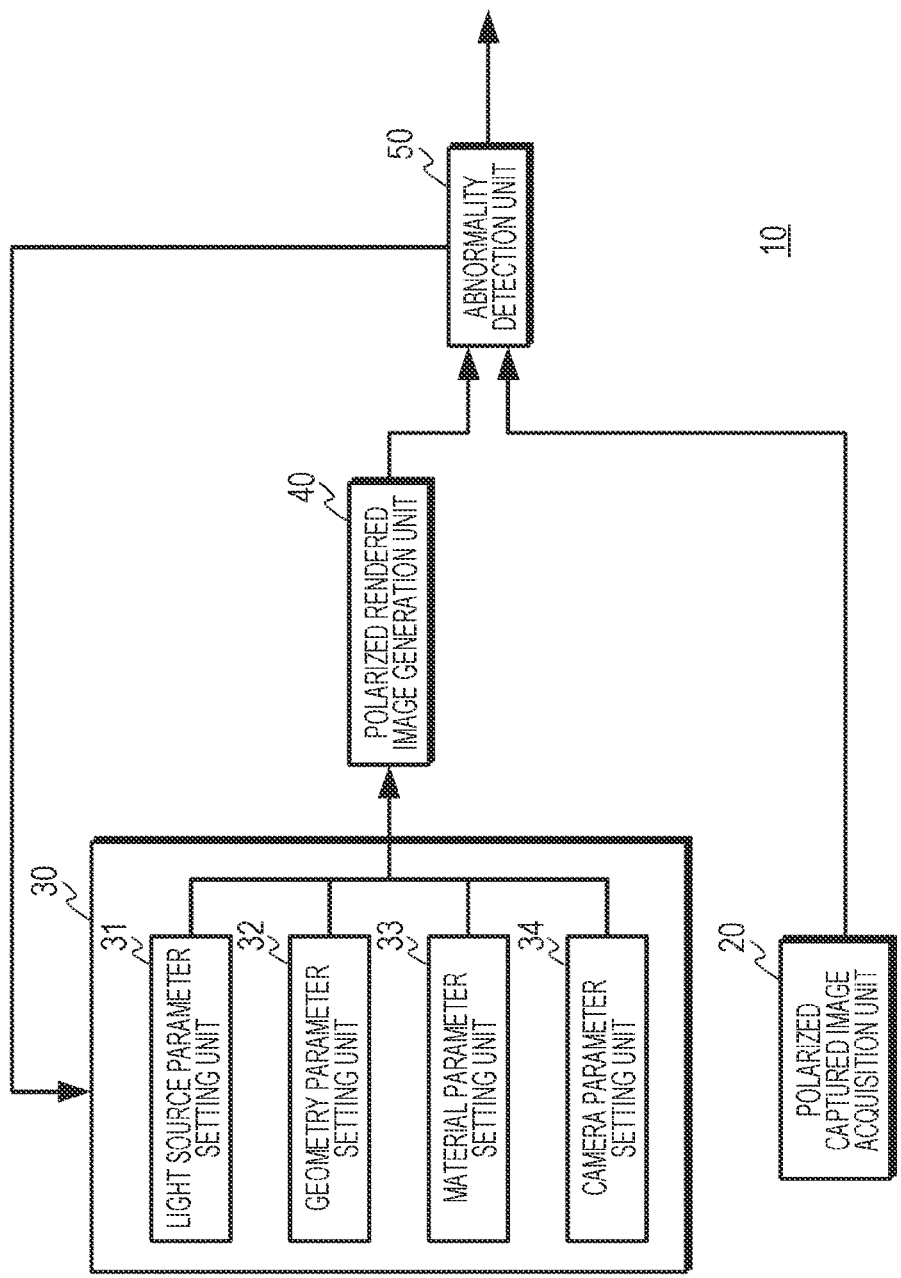

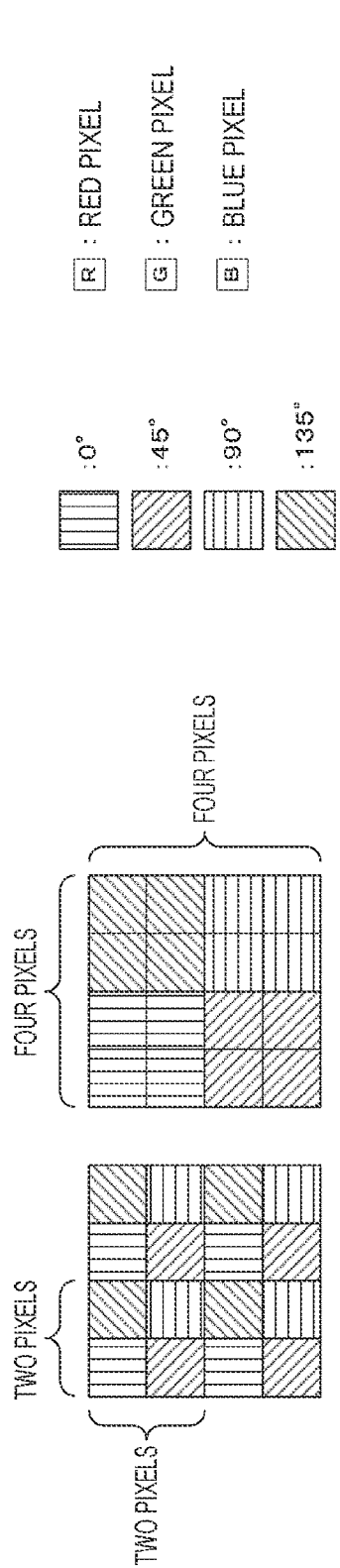
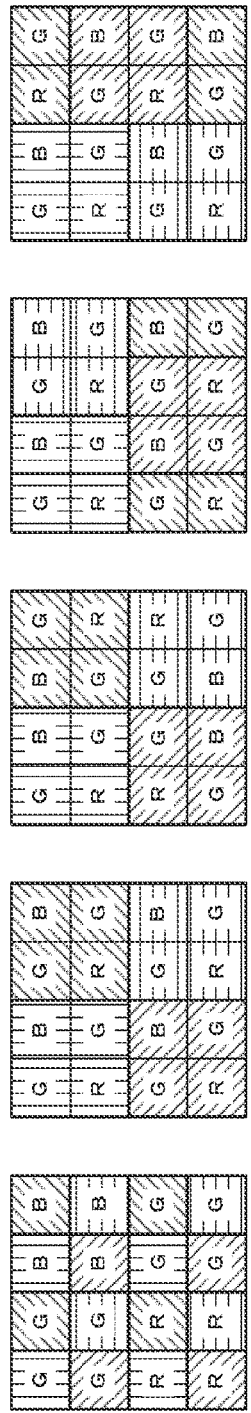
FIG. 3A FIG. 3B FIG. 3C FIG. 3D FIG. 3E FIG. 3F FIG. 3G

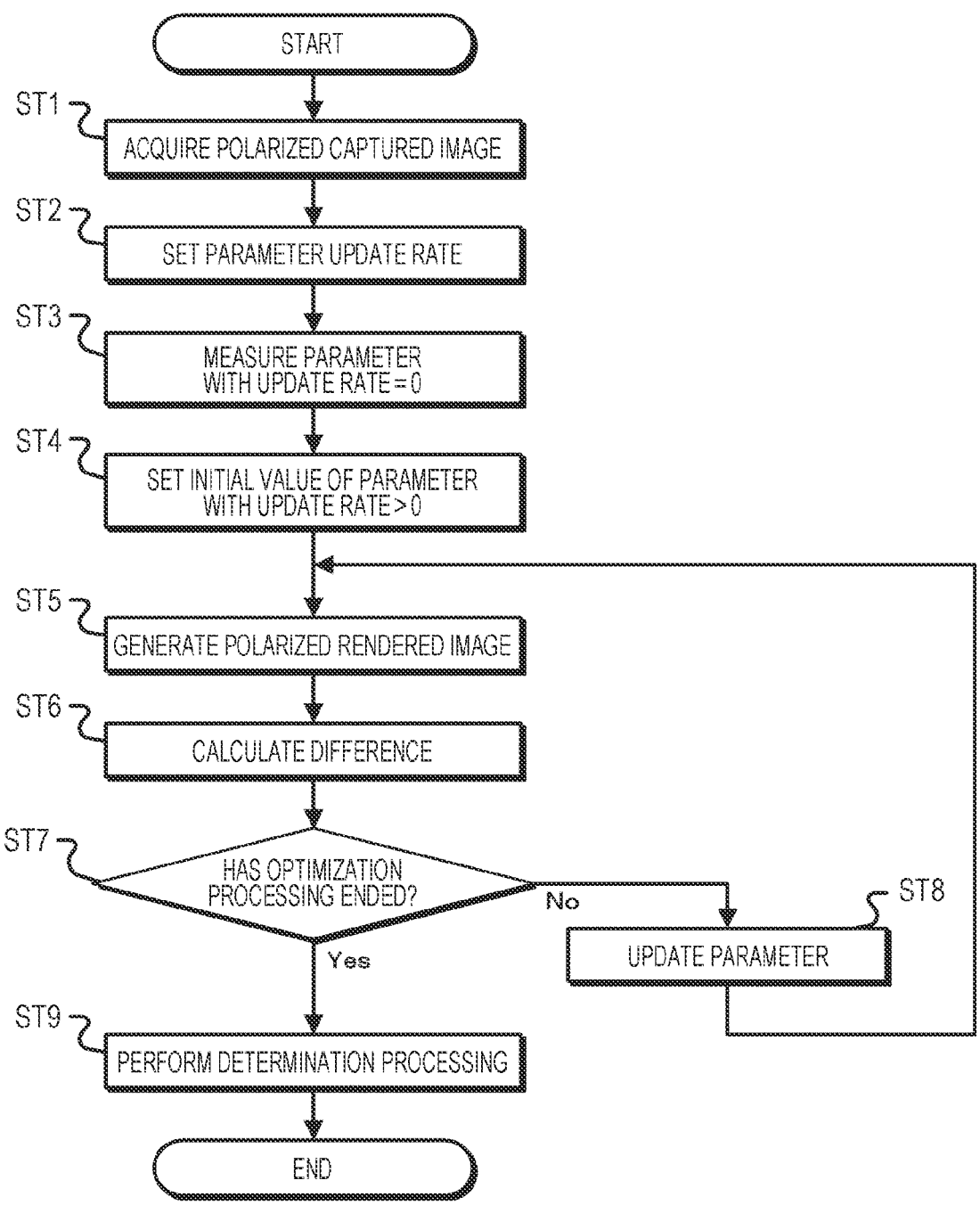

FIG. 12

| CASE | LIGHT SOURCE PARAMETER L | GEOMETRIC PARAMETER G | MATERIAL PARAMETER M | CAMERA PARAMETER L |
|---|---|---|---|---|
| 1: CASE OF INCLUDING ABNORMALITY DETECTION TARGETS HAVING DIFFERENT SHAPES | ON SITE | ON SITE | IN ADVANCE | ON SITE |
| 2: CASE OF INCLUDING ABNORMALITY DETECTION TARGETS HAVING SAME SHAPE AND DIFFERENT POSTURES | ON SITE | AUTOMATICALLY | IN ADVANCE | ON SITE |
| 3: CASE OF NOT OBTAINING INFORMATION REGARDING POLARIZED CAPTURED IMAGE ACQUISITION UNIT | ON SITE | ON SITE | IN ADVANCE | AUTOMATICALLY |
| 4: CASE OF NOT OBTAINING INFORMATION REGARDING LIGHT SOURCE | AUTOMATICALLY | AUTOMATICALLY | IN ADVANCE | ON SITE |
| 5: CASE OF NOT OBTAINING INFORMATION REGARDING POSTURE AND LIGHT SOURCE | AUTOMATICALLY | AUTOMATICALLY | IN ADVANCE | ON SITE |
| 6: CASE OF NOT OBTAINING INFORMATION REGARDING LIGHT SOURCE AND POLARIZED CAPTURED IMAGE ACQUISITION UNIT | AUTOMATICALLY | ON SITE | IN ADVANCE | AUTOMATICALLY |
| 7: CASE OF NOT OBTAINING INFORMATION REGARDING LIGHT SOURCE, POLARIZED CAPTURED IMAGE ACQUISITION UNIT, AND POSTURE | AUTOMATICALLY | AUTOMATICALLY | IN ADVANCE | AUTOMATICALLY |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/013540 filed on Mar. 30, 2021, which claims priority benefit of Japanese Patent Application No. JP 2020-085004 filed in the Japan Patent Office on May 14, 2020. Each of the above-referenced applications is hereby incorporated herein by reference in its entirety.

TECHNICAL FIELD

This technology relates to an information processing device, an information processing method, and a program, and enables detection of an abnormality that does not appear in color information or luminance information.

BACKGROUND ART

Conventionally, luminance information and color information indicated by a captured image have been used to detect an abnormality. For example, in Patent Document 1, a defect of a target object is detected on the basis of luminance information of each image included in images captured by irradiating the target object with light from a plurality of directions. Furthermore, in Patent Document 2, a rendered image corresponding to a visual field of an imaging unit is generated, and an abnormality of an object corresponding to an object model is detected by comparing an image feature of an image region corresponding to the object model in the rendered image with an image feature of a change region extracted from the captured image.

CITATION LIST

Patent Document

Patent Document 1: Japanese Patent Application Laid-Open No. 2016-166842
Patent Document 2: Japanese Patent Application Laid-Open No. 2013-211740

SUMMARY OF THE INVENTION

Problems to be Solved by the Invention

By the way, in the case of detecting an abnormality on the basis of the luminance information or the color information indicated by a captured image, it is difficult to detect an abnormality having a small change in the luminance information or the color information. For example, in a case that a front surface of an object is deformed, the abnormality cannot be detected from the front surface of the object in a case where a contour of a deformed portion is smooth and the change in the luminance information and the color information is small.

Therefore, an object of this technology is to provide an information processing device, an information processing method, and a program capable of detecting an abnormality that is difficult to detect on the basis of luminance information or color information.

Solutions to Problems

A first aspect of this technology resides in
an information processing device including:
a polarization rendering setting unit configured to set a plurality of parameters to be used for generating a polarized rendered image of an abnormality detection target;
a polarized rendered image generation unit configured to generate the polarized rendered image of the abnormality detection target on the basis of the parameters set by the polarization rendering setting unit; and
an abnormality detection unit configured to detect an abnormal region of the abnormality detection target on the basis of a difference between a polarized captured image acquired by imaging the abnormality detection target and the polarized rendered image generated by the polarized rendered image generation unit.

In this technology, the polarization rendering setting unit sets a plurality of parameters to be used for generating a polarized rendered image of an abnormality detection target. The plurality of parameters includes a light source parameter related to a light source, a geometry parameter related to the abnormality detection target, a material parameter related to the polarization characteristic of the abnormality detection target, and a camera parameter of a polarized captured image acquisition unit that acquires the polarized captured image. When the plurality of parameters is measured, for example, the polarization rendering setting unit sets the plurality of measured parameters as the parameters to be used for generating the polarized rendered image. Furthermore, for example, in a case where some or all of the plurality of parameters are not measured, the polarization rendering setting unit performs optimization processing for the unmeasured parameter. In the optimization processing for the parameters, the unmeasured parameter is set as a parameter capable of minimizing the difference between the polarized captured image and the polarized rendered image generated by the polarized rendered image generation unit. The polarization rendering setting unit enables adjustment of a convergence characteristic of the parameter by using a parameter value that has converged by repeating update of the parameter using the difference as an optimized parameter value, for example. The polarization rendering setting unit sets a measured parameter and the parameter calculated by the optimization processing, or the parameter calculated by the optimization processing in a case where there is no measured parameter, as the parameters to be used for generating the polarized rendered image. Note that at least the material parameter is measured in advance, and the polarization rendering setting unit may use the parameter measured in advance in a fixed manner.

The polarized rendered image generation unit generates the polarized rendered image of the abnormality detection target on the basis of the parameters set by the polarization rendering setting unit.

The abnormality detection unit detects the abnormal region of the abnormality detection target in units of pixels on the basis of the difference between the polarized captured image acquired by imaging the abnormality detection target and the polarized rendered image generated by the polarized rendered image generation unit. Furthermore, the abnormality detection unit may estimate an abnormality cause of the detected abnormal region on the basis of information indicating whether the parameter is the measured parameter or the parameter calculated by the optimization processing. Moreover, the abnormality detection unit may detect the abnormal region of the abnormality detection target on the basis of a difference in polarization information by using the polarization information calculated from the polarized captured image and the polarization information calculated from the polarized rendered image.

A second aspect of this technology resides in an information processing method including:

setting, by a polarization rendering setting unit, a plurality of parameters to be used for generating a polarized rendered image of an abnormality detection target;

generating, by a polarized rendered image generation unit, the polarized rendered image of the abnormality detection target on the basis of the parameters set by the polarization rendering setting unit; and detecting, by an abnormality detection unit, an abnormal region of the abnormality detection target on the basis of a difference between a polarized captured image acquired by imaging the abnormality detection target and the polarized rendered image generated by the polarized rendered image generation unit.

A third aspect of this technology resides in a program for causing a computer to execute abnormality detection for an abnormality detection target, the program causing the computer to execute:

a procedure of setting a plurality of parameters to be used for generating a polarized rendered image of the abnormality detection target;

a procedure of generating the polarized rendered image of the abnormality detection target on the basis of the plurality of set parameters; and a procedure of detecting an abnormal region of the abnormality detection target on the basis of a difference between a polarized captured image acquired by imaging the abnormality detection target and the generated polarized rendered image.

Note that the program of the present technology is, for example, a program that can be provided to a general-purpose computer capable of executing various program codes by a storage medium provided in a computer-readable format, a communication medium, for example, a storage medium such as an optical disk, a magnetic disk, or a semiconductor memory, or a communication medium such as a network. By providing such a program in the computer readable format, processing according to the program is implemented on the computer.

BRIEF DESCRIPTION OF DRAWINGS

FIG. 1 is a diagram illustrating a configuration of an information processing device.

FIGS. 3A, 3B, 3C, 3D, 3E, 3F, and 3G are diagrams illustrating pixel configurations in a plurality of polarization directions.

FIG. 4 is a flowchart illustrating an operation of the information processing device.

FIG. 12 is a diagram illustrating a list of operation examples.

MODE FOR CARRYING OUT THE INVENTION

Figure 2A:
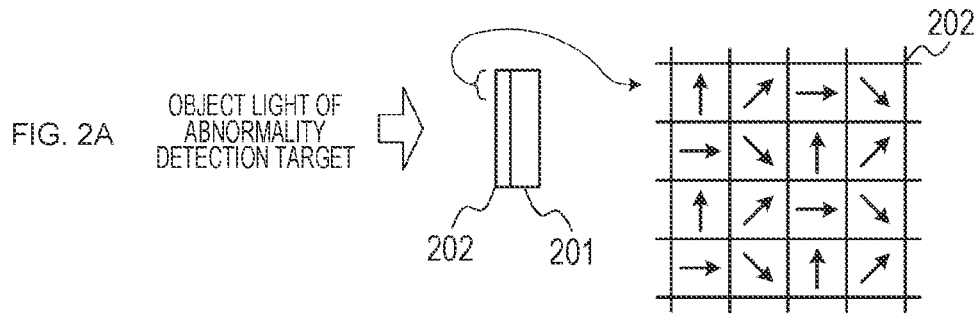
FIGS. 2A, 2B, 2C, and 2D are diagrams illustrating a configuration of a polarized captured image acquisition unit.

Hereinafter, modes for carrying out the present technology will be described. Note that the description will be given in the following order.

1. Polarization rendering and the present technology
2. Configuration of Embodiment
3. Operation of embodiment
3-1. Acquisition of light source parameter
3-2. Acquisition of geometry parameter
3-3. Acquisition of material parameter
3-4. Acquisition of camera parameter
3-5. Optimization processing of image difference and parameters
3-6. Abnormality detection
4. Operation example of embodiment 1. Polarization Rendering and the Present Technology In polarization rendering, a rendered image (hereinafter referred to as a "polarized rendered image") is generated using a polarization characteristic or the like. For example, a polarized rendered image $I^r_\varphi$ is generated on the basis of a function f illustrated in Expression (1), using a light source parameter L, a geometry parameter G of a non-light source (object), a material parameter M indicating a polarization characteristic of the non-light source, and a camera parameter C.

[Math. 1]

$$I^r_\varphi = f_\varphi(L, G, M, C) \qquad (1)$$

Note that the light source parameter L is a vector of parameters indicating position and direction of a light source, a Stokes vector of an irradiation light emitted from the light source, and the like. The geometry parameter G of the non-light source is a vector of parameters indicating shape, position, and posture of the object. The material parameter M of the non-light source is a parameter indicating a Mueller matrix of the object. Furthermore, the camera parameter C is a vector of internal parameters and external parameters of a camera. Moreover, in Expression (1), a parameter $\varphi$ represents an angle (also referred to as a polarization direction) of a linear polarizer (also simply referred to as a "polarizing plate") used when a polarized image (hereinafter referred to as a "polarized captured image") is acquired by the camera.

In the present technology, a difference between the polarized rendered image $I^r_\varphi$ generated by polarization rendering and a polarized captured image $I^r_\varphi$ acquired by performing imaging with the camera provided with the polarizing plate having the angle $\varphi$ is calculated for each region of a predetermined unit of pixels using the polarized rendered image $I^r_\varphi$ and the polarized captured image $I^r_\varphi$, and a region where the difference is larger than a preset determination threshold is set as an abnormal region.

2. Configuration of Embodiment

FIG. 1 illustrates a configuration of an information processing device. An information processing device 10 includes a polarized captured image acquisition unit 20, a polarization rendering setting unit 30, a polarized rendered image generation unit 40, and an abnormality detection unit 50.

Figure 2B:
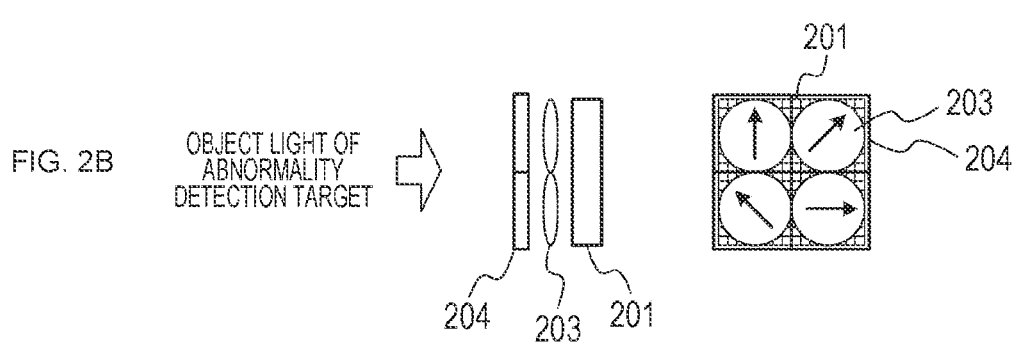
Figure 2C:
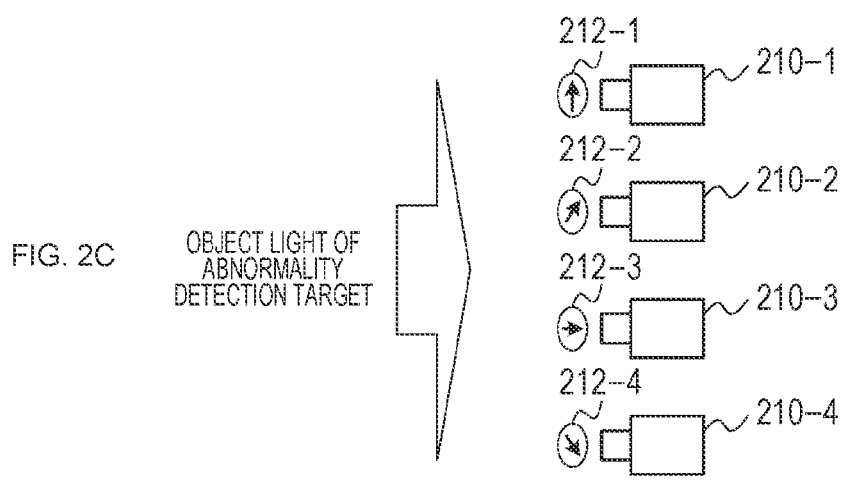

The polarized captured image acquisition unit 20 images an abnormality detection target and acquires a polarized captured image. FIGS. 2A, 2B, 2C, and 2D illustrate a configuration of the polarized captured image acquisition unit. For example, as illustrated in FIG. 2A, the polarized captured image acquisition unit 20 generates the polarized captured image by having a polarizing plate 202 arranged on an image sensor 201, the polarizing plate 202 having a pixel configuration in a plurality of polarization directions, and performing imaging. Note that FIG. 2A illustrates a case where the polarizing plate 202 in which each pixel is any of pixels in four different types of polarization directions (the polarization directions are illustrated by the arrows) is arranged on a front surface of the image sensor 201. Furthermore, as illustrated in FIG. 2B, the polarized captured image acquisition unit 20 may generate a plurality of polarized captured images having different polarization directions using a configuration of a multi-lens array. For example, a plurality of (four in the figure) lenses 203 is provided in front of the image sensor 201, and each lens 203 forms an optical image of an object on an imaging surface of the image sensor 201. Furthermore, a polarizing plate 204 is provided in front of each lens 203, and a plurality of polarized captured images having different polarization directions is generated with the polarization directions (the polarization directions are illustrated by the arrows) of the polarizing plate 204 as different directions. By configuring the polarized captured image acquisition unit 20 in this manner, it is possible to acquire a plurality of polarized captured images by one imaging, and thus to promptly perform abnormality detection. Furthermore, as illustrated in FIG. 2C, with a configuration in which polarizing plates 212-1 to 212-4 having different polarization directions from one another are provided in front of imaging units 210-1 to 210-4, a plurality of polarized images having different polarization directions (the polarization directions are illustrated by the arrows) may be generated from a plurality of different viewpoints.

Figure 2D:
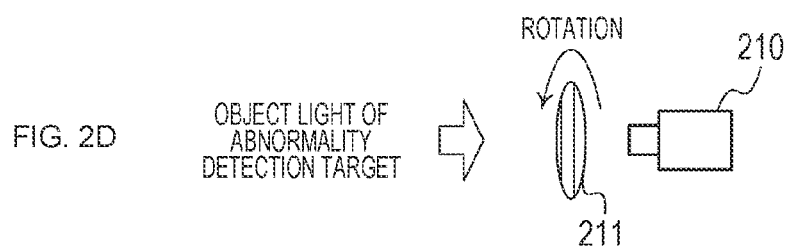

Note that, in a case where movement of the abnormality detection target is slow or in a case where an abnormality recognition target operates in a stepwise manner, the polarizing plate 211 may be provided in front of the imaging unit 210, as illustrated in FIG. 2D. In this case, the polarizing plate 211 is rotated and imaging is performed in a plurality of different polarization directions, and a plurality of polarized captured images with different polarization directions is acquired.

The plurality of different polarization directions may be any combination of angles as long as all the angles are different. For example, 0 degrees, 60 degrees, and 120 degrees are used in a case where three polarization directions are used, or 0 degrees, 45 degrees, 90 degrees, and 135 degrees are used in a case where four polarization directions are used.

In a case where a color filter is not used in the image sensor 201, the polarized captured image acquisition unit 20 can acquire a luminance polarized captured image. Here, in the case of FIG. 2A, it is possible to acquire an image equivalent to an unpolarized normal luminance image by averaging the luminance of four adjacent pixels in different polarization directions. Furthermore, in the cases of FIGS. 2B and 2C, when positional intervals of the lenses 203 and the imaging units 210-1 to 210-4 are negligibly shorter than a distance to the abnormality detection target, parallaxes can be ignored in the plurality of polarized captured images having different polarization directions. Therefore, it is possible to acquire an image equivalent to an unpolarized normal luminance image by averaging the luminance of the polarized captured images different polarization directions. Furthermore, in a case where the parallaxes cannot be ignored, it is possible to acquire an image equivalent to an unpolarized normal luminance image by aligning the polarized captured images having different polarization directions according to a parallax amount and averaging the luminance of the aligned polarized captured images. Furthermore, in the case of FIG. 2D, it is possible to acquire an image equivalent to an unpolarized normal luminance image by averaging the luminance of the luminance polarized captured images having different polarization directions for each pixel.

Moreover, the polarized image acquisition unit 20 may simultaneously generate not only the luminance polarized captured image but also a trichromatic image by providing a color filter in the image sensor 201 or may simultaneously generate an infrared image or the like. Furthermore, the polarized image acquisition unit 20 may calculate the luminance from the trichromatic image to generate a luminance image.

FIGS. 3A, 3B, 3C, 3D, 3E, 3F, and 3G illustrate pixel configurations in a plurality of polarization directions, and the configurations illustrated in FIGS. 3A, 3B, 3C, 3D, 3E, 3F, and 3G are repeated in a horizontal direction and a vertical direction. FIGS. 3A and 3B illustrate pixel configurations in a case of acquiring a black-and-white image. Note that FIG. 3A illustrates a case where a polarization pixel block of 2×2 pixels include, for example, polarization pixels having polarization directions (polarization angles) of 0 degrees, 45 degrees, 90 degrees, and 135 degrees. Furthermore, Fig. 3B illustrates a case where a polarization pixel block of 4×4 pixels include, for example, polarization pixels having polarization directions of 0 degrees, 45 degrees, 90 degrees, and 135 degrees, with 2×2 pixels as a unit of polarization direction. Note that, in the case where a polarization component unit of the polarizing plate is 2×2 pixels as illustrated in Fig. 3B, a ratio of leakage of a polarization component from a region of a different adjacent polarization component unit to the polarization component obtained for each polarization component unit is smaller than that of 1×1 pixel illustrated in FIG. 3A. Furthermore, in a case where the polarizing plate uses a wire grid, polarized light having an electric field component is perpendicular to a direction of the grid (wire direction) is transmitted, and transmittance increases as the wire is longer. Therefore, in the case where the polarization component unit is 2×2 pixels, the transmittance is higher than that of 1×1 pixel. Therefore, in the case where the polarization component unit is 2×2 pixels, the transmittance is higher than that of 1×1 pixel, and an extinction ratio can be improved.

FIGS. 3C, 3D, 3E, 3F, and 3G illustrate pixel configurations in a case of acquiring a color image. FIG. 3C illustrates a case where a polarization pixel block of 2×2 pixels illustrated in FIG. 3A is set as one color unit, and three primary color pixels (red pixels, green pixels, and red pixels) are arranged in a Bayer array.

FIG. 3D illustrates a case where the three primary color pixels are provided in a Bayer array for each pixel block of 2×2 pixels in the same polarization direction illustrated in FIG. 3B.

FIG. 3E illustrates a case where the three primary color pixels are provided in a Bayer array for each pixel block of 2×2 pixels in the same polarization direction, and blocks of 2×2 pixels having different polarization directions are set to have pixels of the same color.

FIG. 3E illustrates a case where, for a pixel block of a Bayer array in the same polarization direction of 2×2 pixels, a phase difference in the polarization direction from a pixel block adjacent in the horizontal direction is 90 degrees, and the phase difference in the polarization direction from a pixel block adjacent in the vertical direction is ±45 degrees.

FIG. 3G illustrates a case where, for a pixel block of a Bayer array in the same polarization direction of 2×2 pixels, a phase difference in the polarization direction from a pixel block adjacent in the vertical direction is 90 degrees, and the phase difference in the polarization direction from a pixel block adjacent in the horizontal direction is +45 degrees.

Furthermore, in the pixel configuration, a block of 2×2 pixels may include three primary color pixels and a white pixel, or may include pixel blocks of three primary colors and pixel blocks of white. Moreover, the block of 2×2 pixels may include polarization pixels having different polarization directions and unpolarization pixels, or may include polarization pixel blocks having different polarization directions and unpolarization pixel blocks. In the case of using such a pixel configuration, the polarized captured image acquisition unit 20 generates, for each polarization direction, a polarized captured image having a resolution in units of pixels, that is, in units of pixel blocks of a predetermined number of pixels. Furthermore, in the case where the pixel block is in the Bayer array, a polarized captured image having a resolution in units of one pixel may be generated for each polarization direction using existing demosaic processing.

In a case where the plurality of parameters to be used for generating a polarized rendered image is measured, the polarization rendering setting unit 30 sets the plurality of measured parameters as the parameters to be used for generating the polarized rendered image. Furthermore, in a case where some or all of the plurality of parameters are not measured, the polarization rendering setting unit 30 performs optimization processing for the unmeasured parameter, and sets a measured parameter and the parameter calculated by the optimization processing, or the parameter calculated by the optimization processing in a case where there is no measured parameter, as the parameters to be used for generating the polarized rendered image. The polarization rendering setting unit 30 performs optimization processing for the parameters, and calculates a parameter capable of minimizing the difference between the polarized captured image and the polarized rendered image. For example, the polarization rendering setting unit uses a parameter value that has converged by repeating update of the parameter using the difference as an optimized parameter value. Furthermore, the polarization rendering setting unit 30 enables adjustment of a convergence characteristic of the parameter by using an update rate to be described below.

The plurality of parameters used for generating the polarized rendered image includes the light source parameter related to a light source, the geometry parameter related to the abnormality detection target, the material parameter related to the polarization characteristic of the abnormality detection target, and the camera parameter of the polarized captured image acquisition unit that acquires the polarized captured image. As illustrated in FIG. 1, the polarization rendering setting unit 30 includes a light source parameter setting unit 31, a geometry parameter setting unit 32, a material parameter setting unit 33, and a camera parameter setting unit 34.

The light source parameter setting unit 31 sets position and direction of a light source, a Stokes vector of irradiation light emitted from the light source, and the like as the light source parameters in order to generate the polarized rendered image. The light source parameter setting unit 31 may use the light source parameter measured in advance in a fixed manner, or may use a measurement result of the light source parameter performed before rendering processing in a fixed manner. Furthermore, in a case where the light source parameter has not been measured, optimization processing is performed for parameters, rendering processing is started using a preset initial value, and the light source parameter that can minimize the difference between the polarized captured image and the polarized rendered image is calculated and used.

The geometry parameter setting unit 32 sets the shape, position, and posture of the abnormality detection target as the geometry parameters. The geometry parameter setting unit 32 may use the geometry parameter measured in advance in a fixed manner, or may use a measurement result of the geometry parameter performed before rendering processing in a fixed manner. Furthermore, in a case where the geometry parameter has not been measured, optimization processing is performed for parameters, rendering processing is started using a preset initial value, and the geometry parameter that can minimize the difference between the polarized captured image and the polarized rendered image is calculated and used.

The material parameter setting unit 33 sets a Mueller matrix indicating a polarization characteristic of the abnormality detection target as the material parameter. The material parameter setting unit 33 may use the material parameter measured in advance in a fixed manner, or may use a measurement result of the material parameter performed before rendering processing in a fixed manner. Furthermore, in a case where the material parameter has not been measured, optimization processing is performed for parameters, rendering processing is started using a preset initial value, and the material parameter that can minimize the difference between the polarized captured image and the polarized rendered image is calculated and used.

The camera parameter setting unit 34 sets internal parameters and external parameters of the camera as the camera parameters. The camera parameter setting unit 34 may use the camera parameter measured in advance in a fixed manner, or may use a measurement result of the camera parameter performed before rendering processing in a fixed manner. Furthermore, in a case where the camera parameter has not been measured, optimization processing is performed for parameters, rendering processing is started using a preset initial value, and the camera parameter that can minimize the difference between the polarized captured image and the polarized rendered image is calculated and used.

The polarization rendering setting unit 30 outputs the parameters set by the light source parameter setting unit 31, the geometry parameter setting unit 32, the material parameter setting unit 33, and the camera parameter setting unit 34 to the polarized rendered image generation unit 40. Furthermore, the polarization rendering setting unit 30 may generate information (hereinafter referred to as "parameter attribute information") indicating, for each parameter, whether the parameter is a measured parameter or a parameter calculated by the optimization processing, whether the optimization processing has been completed, or the like, and output the information to the abnormality detection unit 50.

The polarized rendered image generation unit 40 generates a polarized rendered image on the basis of the parameters set by the polarization rendering setting unit 30, and outputs the generated polarized rendered image to the abnormality detection unit 50.

The abnormality detection unit 50 calculates the difference between the polarized captured image acquired by the polarized captured image acquisition unit 20 and the polarized rendered image generated by the polarized rendered image generation unit 40. Furthermore, the abnormality detection unit 50 outputs the calculated difference to the polarization rendering setting unit 30 when the parameter optimization processing is performed on the basis of the parameter attribute information generated by the polarization rendering setting unit 30. Furthermore, when the parameter attribute information indicates that all the optimization processing have been completed, the abnormality detection unit 50 compares the difference between the polarized captured image and the polarized rendered image with a determination threshold and detects a pixel region in which the difference is larger than the determination threshold as an abnormal region.

3. Operation of Embodiment

FIG. 4 is a flowchart illustrating an operation of the information processing device. In step ST1, the information processing device acquires the polarized captured image. The polarized captured image acquisition unit 20 of the information processing device 10 images the abnormality detection target to acquire the polarized captured image, and then proceeds to step ST2.

In step ST2, the information processing device sets a parameter update rate. The polarization rendering setting unit 30 of the information processing device 10 sets an update rate $\alpha_L$ for the light source parameter L. Furthermore, the polarization rendering setting unit 30 sets update rates $\alpha_G$, $\alpha_M$, and $\alpha_C$ for the geometry parameter G, the material parameter M, and the camera parameter C, respectively, and proceeds to step ST3.

The update rate is information for setting a parameter correction amount on the basis of the difference between the polarized captured image and the polarized rendered image when the parameter optimization processing is performed. In a case where the update rate is "0", the polarization rendering setting unit 30 does not perform the optimization processing because the parameter correction amount is "0". Furthermore, in a case where the parameter correction amount is larger than "0", the polarization rendering setting unit 30 calculates the parameter correction amount on the basis of an abnormality detection result and performs the optimization processing. Note that details of the operation using the update rate will be described below.

In step ST3, the information processing device sets a parameter with the update rate=0. For the parameter with the update rate=0, the polarization rendering setting unit 30 sets the parameter value acquired in advance or the parameter value calculated by performing parameter measurement processing in a case where the parameter value has not been acquired in advance, as a parameter value to be used in rendering, and proceeds to step ST4.

In step ST4, the information processing device sets an initial value of a parameter with the update rate>0. Since the polarization rendering setting unit 30 performs the optimization processing for the parameter with the update rate>0 to automatically calculate an optimum parameter value, the initial value of the parameter with the update rate>0 is set to an arbitrary value or a value specified in advance, and the processing proceeds to step ST5.

In step ST5, the information processing device generates the polarized rendered image. The polarized rendered image generation unit 40 of the information processing device 10 performs the rendering processing using the parameter values set in steps ST3 and ST4 or the parameter value set in step ST3 and the parameter value updated in step ST8 to be described below to generate the polarized rendered image, and proceeds to step ST6.

In step ST6, the information processing device calculates the difference. The abnormality detection unit 50 of the information processing device 10 calculates the difference between the polarized captured image acquired in step ST1 and the polarized rendered image generated in step ST5, and proceeds to step ST7.

In step ST7, the information processing device determines whether the optimization processing has ended. The polarization rendering setting unit 30 performs, for the parameter with the update rate>0, the optimization processing of updating the parameter using a differential result for each parameter with respect to the difference at a rate according to the update rate to converge the parameter. In a case where each parameter with the update rate>0 has converged, the polarization rendering setting unit 30 determines that the optimization processing has ended, and proceeds to step ST9. Furthermore, in a case where there is a parameter that has not converged, the processing proceeds to step ST8.

In step ST8, the information processing device updates the parameter. The polarization rendering setting unit 30 calculates the correction amount of each parameter with the update rate>0, using the differential result for each parameter with respect to the difference and the update rate. Moreover, the polarization rendering setting unit 30 corrects the parameter using the calculated correction amount and returns to step ST5.

In step ST9, the information processing device performs determination processing. The abnormality detection unit 50 of the information processing device 10 compares the difference with the determination threshold in units of pixels, and discriminates a pixel region smaller than the determination threshold as a normal region, and a pixel region equal to or larger than the determination threshold as an abnormal region.

Next, in the operation of the information processing device, acquisition of the light source parameter L, acquisition of the geometry parameter G, acquisition of the material parameter M, acquisition of the camera parameter, parameter optimization processing, and abnormality detection processing will be individually described. Note that, in a case where the parameters are measured in advance, a parameter acquisition unit may be provided separately from the polarization rendering setting unit 30. Furthermore, in a case where the parameters are measured on site where abnormality detection is performed, the function of the parameter acquisition unit may be provided in the parameter setting unit of the polarization rendering setting unit 30.

3-1. Acquisition of Light Source Parameter

Next, acquisition of the light source parameter will be described. The light source parameter acquisition unit that acquires the light source parameter includes, for example, an imaging unit and an environmental imaging unit provided with a polarizing plate capable of changing the polarization direction in front of the imaging unit. The light source parameter acquisition unit sets the polarization direction to a plurality of predetermined polarization directions, calculates a Stokes vector on the basis of the polarized captured images of the plurality of polarization directions obtained by imaging the light source for each of the polarization directions, and uses the Stokes vector as the light source parameter.

Figure 5:
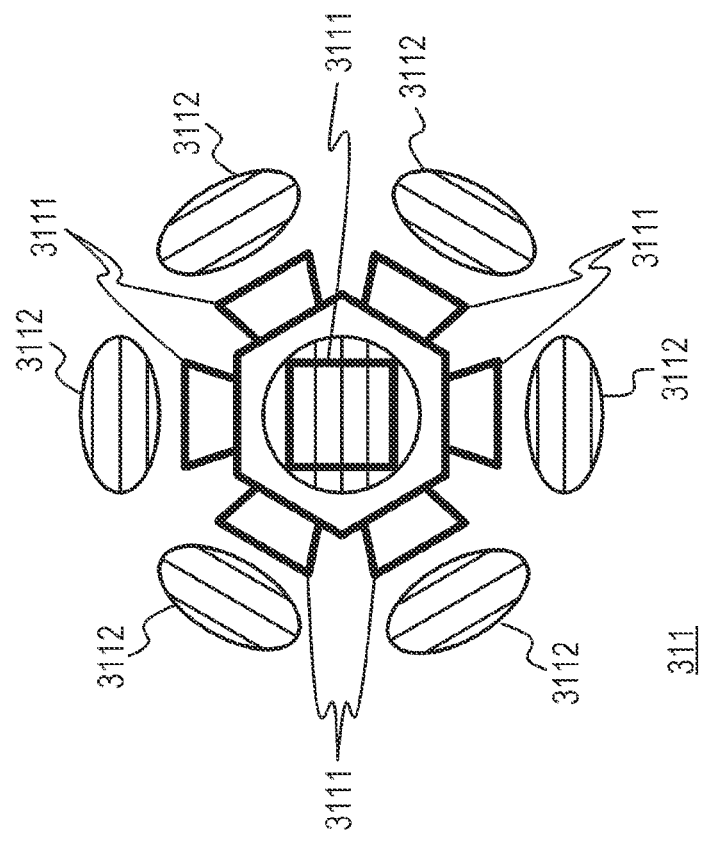
FIG. 5 is a diagram illustrating a configuration of an environment imaging unit.

FIG. 5 illustrates a configuration of an environment imaging unit. An environment imaging unit 311 includes, for example, a plurality of imaging units 3111 having different imaging directions, and polarizing plates 3112 capable of changing the polarization direction in front of the respective imaging units. Note that the polarization directions of the polarizing plates 3112 are equal to one another. The environment imaging unit 311 images an environment at the time of imaging the abnormality detection target and generates, for example, a polarized captured image of an entire celestial sphere for each of the plurality of polarization directions. Note that the environment imaging unit 311 may acquire the polarized captured image of the entire celestial sphere for each of the plurality of polarization directions using one imaging unit 3111 and the polarizing plate 3112 using a fisheye lens or the like. Furthermore, the environment imaging unit 311 is not limited to the case of generating the polarized captured image of the entire celestial sphere. For example, in a case where the light source is provided only in a limited range, the polarized captured image in the limited range may be generated.

Figure 6B:
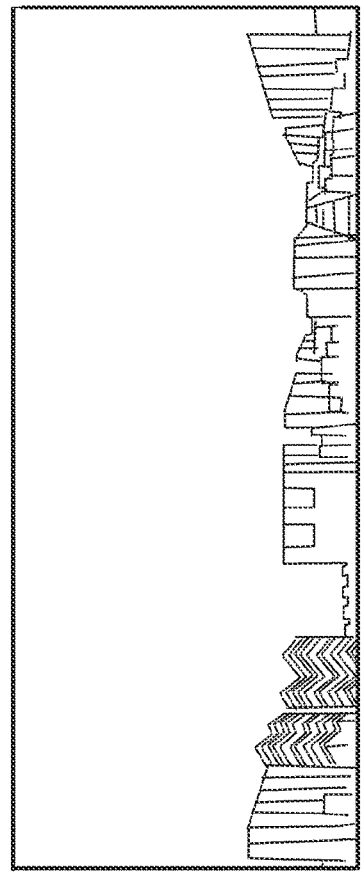
FIGS. 6A and 6B are diagrams illustrating polarized captured images generated by the environment imaging unit.
Figure 6A:
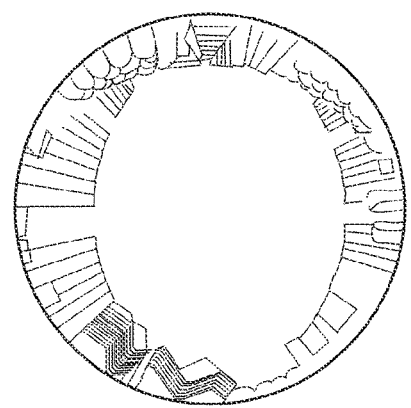

FIGS. 6A and 6B illustrate polarized captured images generated by the environment imaging unit. Note that FIG. 6A illustrates a fisheye image illustrating the entire celestial sphere, and FIG. 6B illustrates a developed image obtained by developing the fisheye image on a cylindrical surface.

A light source parameter calculation unit divides the polarized captured image generated by the environment imaging unit 311 into a zenith direction and an azimuth direction, and uses an average incident Stokes vector in the region as the light source parameter for each divided region. Furthermore, the light source parameter calculation unit may calculate the average incident direction of light beams and include the average incident direction as the light source parameter.

Figure 7A:
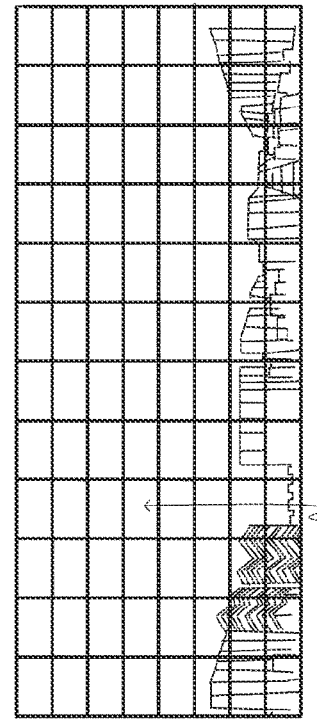
FIGS. 7A, 7B, and 7C are diagrams illustrating division of a polarized captured image.
Figure 7B:
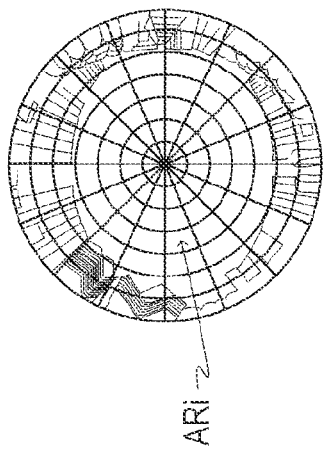
Figure 7C:
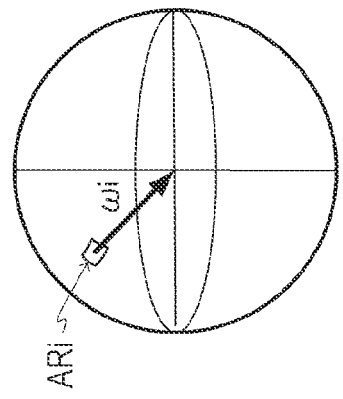

FIGS. 7A, 7B, and 7C illustrate division of a polarized captured image. Note that FIG. 7A illustrates a division example of the fisheye image illustrated in FIG. 6A, and FIG. 7B illustrates a division example of the developed image illustrated in FIG. 6B.

Figure 8:
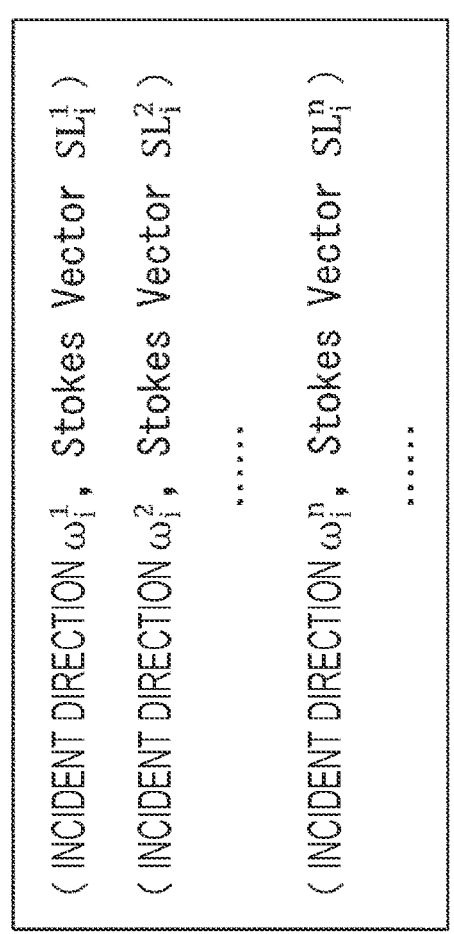
FIG. 8 is a diagram illustrating a light source parameter L.

Here, as illustrated in FIG. 7C, in a case where a light source position of polarized incident light in an incident direction wi is included in a region ARi, the light source parameter calculation unit calculates an average incident direction in the region ARi and an average incident Stokes vector SLi as illustrated in Expression (2). Similarly, the average incident direction and the average incident Stokes vector are calculated for the other regions. Note that, in Expression (2), an observation value IL (0°) is an observation value obtained by imaging the light source and having the polarization direction of 0°, an observation value IL (45°) is an observation value obtained by imaging the light source and having the polarization direction of 45°, an observation value IL (90°) is an observation value obtained by imaging the light source and having the polarization direction of 90°, and an observation value IL (135°) is an observation value obtained by imaging the light source and having the polarization direction of 135°. Furthermore, FIG. 8 illustrates the light source parameter L.

[Math. 2]

$$SL_i = \begin{bmatrix} SL_i^0 \\ SL_i^1 \\ SL_i^2 \end{bmatrix} = \begin{bmatrix} IL(0°) + IL(0°) \\ IL(0°) - IL(90°) \\ IL(45°) - IL(135°) \end{bmatrix} \quad (2)$$

3-2. Acquisition of Geometry Parameter

Next, acquisition of the geometry parameter will be described. In a case of acquiring the geometry parameters before the rendering processing, various existing shape measurement methods are only required to be used. For example, parameters indicating the shape, position, and posture of the abnormality detection target are set using a time of flight (ToF) sensor, a stereo camera having a plurality of viewpoints, or the like. Furthermore, in a case where the abnormality detection target is primitive geometry, for example, in a case where the abnormality detection target is a cone, a cube, a sphere, or the like, a mathematical expression indicating the shape, position, and posture of the abnormality detection target may be used as the geometry parameter. In this case, the rendering processing can be performed without performing shape measurement.

3-3. Acquisition of Material Parameter

Figure 9:
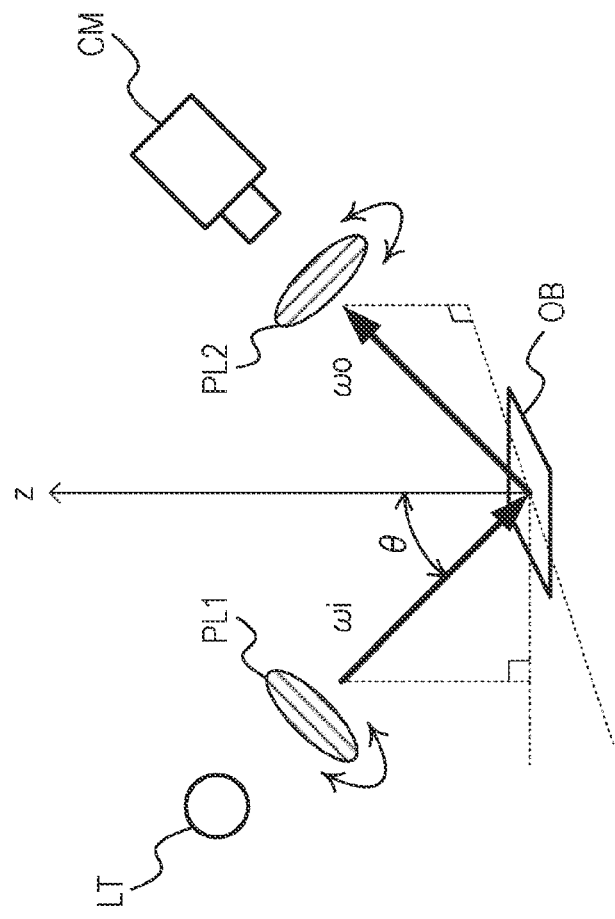
FIG. 9 is a diagram for describing material polarization characteristics.

Next, acquisition of the material parameter will be described. FIG. 9 is a diagram for describing material polarization characteristics. A measurement object OB is irradiated with light emitted from a light source LT via, for example, a polarizing plate PL1, and an imaging unit (hereinafter referred to as a "measurement object imaging unit") CM that images the measurement object of the material parameter images the measurement object OB via, for example, the polarizing plate PL2. Note that a Z direction indicates the zenith direction, and an angle θ is a zenith angle.

When the polarization directions of the polarizing plates (PL1 and PL2) are, for example, 0°, 45°, 90°, or 135°, and the pixel value obtained by imaging the measurement object using the measurement object imaging unit CM is an observation value I, the relationship among the observation value I (0°) when the polarization direction is 0°, the observation value I (45°) when the polarization direction is 45°, the observation value I (90°) when the polarization direction is 90° , and the observation value I (135°) when the polarization direction is 135° can be represented by a Stokes vector S=[s$^0$, s$^1$, s$^2$]$^T$. Note that the relationship between the Stokes vector and the observation value is represented by Expression (3).

[Math. 3]

$$S = \begin{bmatrix} S^0 \\ S^1 \\ S^2 \end{bmatrix} = \begin{bmatrix} I(0°) + I(90°) \\ I(0°) - I(90°) \\ I(45°) - I(135°) \end{bmatrix} \quad (3)$$

In the Stokes vector, the component s$^0$ indicates unpolarized luminance or average luminance. Furthermore, the component s$^1$ indicates a difference in intensity between the polarization directions of 0° and 90°, and the component s$^2$ indicates a difference in intensity between the polarization directions of 45° and 135°. That is, the Stokes vector of 0° is [1, 1, 0]$^T$, the Stokes vector of 45° is [1, 0, 1]$^T$, the Stokes vector of 90° is [1, −1, 0]$^T$, and the Stokes vector of 135° is [1, 0, −1]$^T$.

Here, Expression (4) is established where the Stokes vector of the light in the incident direction ωi emitted to the measurement object OB is "Si", the Stokes vector of the light in an emission direction ωo observed by the measurement object imaging unit CM is "So", and a Muller matrix in the case of the incident direction ωi and the emission direction ωo is M (ωo, ωi). Note that Expression (4) represents Expression (3) as a determinant.

$$M(\omega o, \omega i) * Si = So \quad (3)$$

[Math. 4]

$$\begin{bmatrix} m_{00} & m_{01} & m_{02} \\ m_{10} & m_{11} & m_{12} \\ m_{20} & m_{21} & m_{22} \end{bmatrix} \begin{bmatrix} S_i^0 \\ S_i^1 \\ S_i^2 \end{bmatrix} = \begin{bmatrix} S_o^0 \\ S_o^1 \\ S_o^2 \end{bmatrix} \quad (4)$$

Expression (4) becomes Expression (5) in the case where the polarization direction of the incident light emitted to the measurement object OB is 0°. Furthermore, Expression (4) becomes Expression (6) in the case where the polarization direction of the incident light is 45°, becomes Expression (7) in the case where the polarization direction of the incident light is 90°, and becomes Expression (8) in the case where the polarization direction of the incident light is 135°.

[Math. 5]

$$\begin{bmatrix} m_{00} & m_{01} & m_{02} \\ m_{10} & m_{11} & m_{12} \\ m_{20} & m_{21} & m_{22} \end{bmatrix} \begin{bmatrix} 1 \\ 1 \\ 0 \end{bmatrix} = \begin{bmatrix} S_{0°}^0 \\ S_{0°}^1 \\ S_{0°}^2 \end{bmatrix} \quad (5)$$

$$\begin{bmatrix} m_{00} & m_{01} & m_{02} \\ m_{10} & m_{11} & m_{12} \\ m_{20} & m_{21} & m_{22} \end{bmatrix} \begin{bmatrix} 1 \\ -1 \\ 0 \end{bmatrix} = \begin{bmatrix} S_{90°}^0 \\ S_{90°}^1 \\ S_{90°}^2 \end{bmatrix} \quad (6)$$

$$\begin{bmatrix} m_{00} & m_{01} & m_{02} \\ m_{10} & m_{11} & m_{12} \\ m_{20} & m_{21} & m_{22} \end{bmatrix} \begin{bmatrix} 1 \\ 0 \\ 1 \end{bmatrix} = \begin{bmatrix} S_{45°}^0 \\ S_{45°}^1 \\ S_{45°}^2 \end{bmatrix} \quad (7)$$

$$\begin{bmatrix} m_{00} & m_{01} & m_{02} \\ m_{10} & m_{11} & m_{12} \\ m_{20} & m_{21} & m_{22} \end{bmatrix} \begin{bmatrix} 1 \\ 0 \\ -1 \end{bmatrix} = \begin{bmatrix} S_{135°}^0 \\ S_{135°}^1 \\ S_{135°}^2 \end{bmatrix} \quad (8)$$

Therefore, the Muller matrix M (ωo, ωi) represented as Expression (9) can be calculated on the basis of Expressions (5) to (8). Moreover, normalization is performed to exclude an influence of the luminance in the Muller matrix M (ωo, ωi). Expression (10) represents the Muller matrix M (ωo, ωi) after normalization.

[Math. 6]

$$\begin{bmatrix} m_{00} = \frac{S_{0°}^0 + S_{90°}^0}{2} & m_{01} = \frac{S_{0°}^0 - S_{90°}^0}{2} & m_{02} = \frac{S_{45°}^0 - S_{135°}^0}{2} \\ m_{10} = \frac{S_{0°}^1 + S_{90°}^1}{2} & m_{11} = \frac{S_{0°}^1 - S_{90°}^1}{2} & m_{12} = \frac{S_{45°}^1 - S_{135°}^1}{2} \\ m_{20} = \frac{S_{0°}^2 + S_{90°}^2}{2} & m_{21} = \frac{S_{0°}^2 - S_{90°}^2}{2} & m_{22} = \frac{S_{45°}^2 - S_{135°}^2}{2} \end{bmatrix} \quad (9)$$

$$\begin{bmatrix} 1 & m_{01}/m_{00} & m_{02}/m_{00} \\ m_{10}/m_{00} & m_{11}/m_{00} & m_{12}/m_{00} \\ m_{20}/m_{00} & m_{21}/m_{00} & m_{22}/m_{00} \end{bmatrix} \quad (10)$$

The Muller matrix thus calculated indicates a polarization reflection characteristic unique to the material as the measurement object, and the calculated Muller matrix is used as the material parameter. Note that, since the polarization reflection characteristic does not depend on an external environment, the polarization reflection characteristic can be used in any place once measured, and it is not necessary to repeatedly acquire the polarization reflection characteristic.

Therefore, if the material parameter is measured in advance, setting of the parameters required for the polarized rendered image becomes easy.

Figure 10:
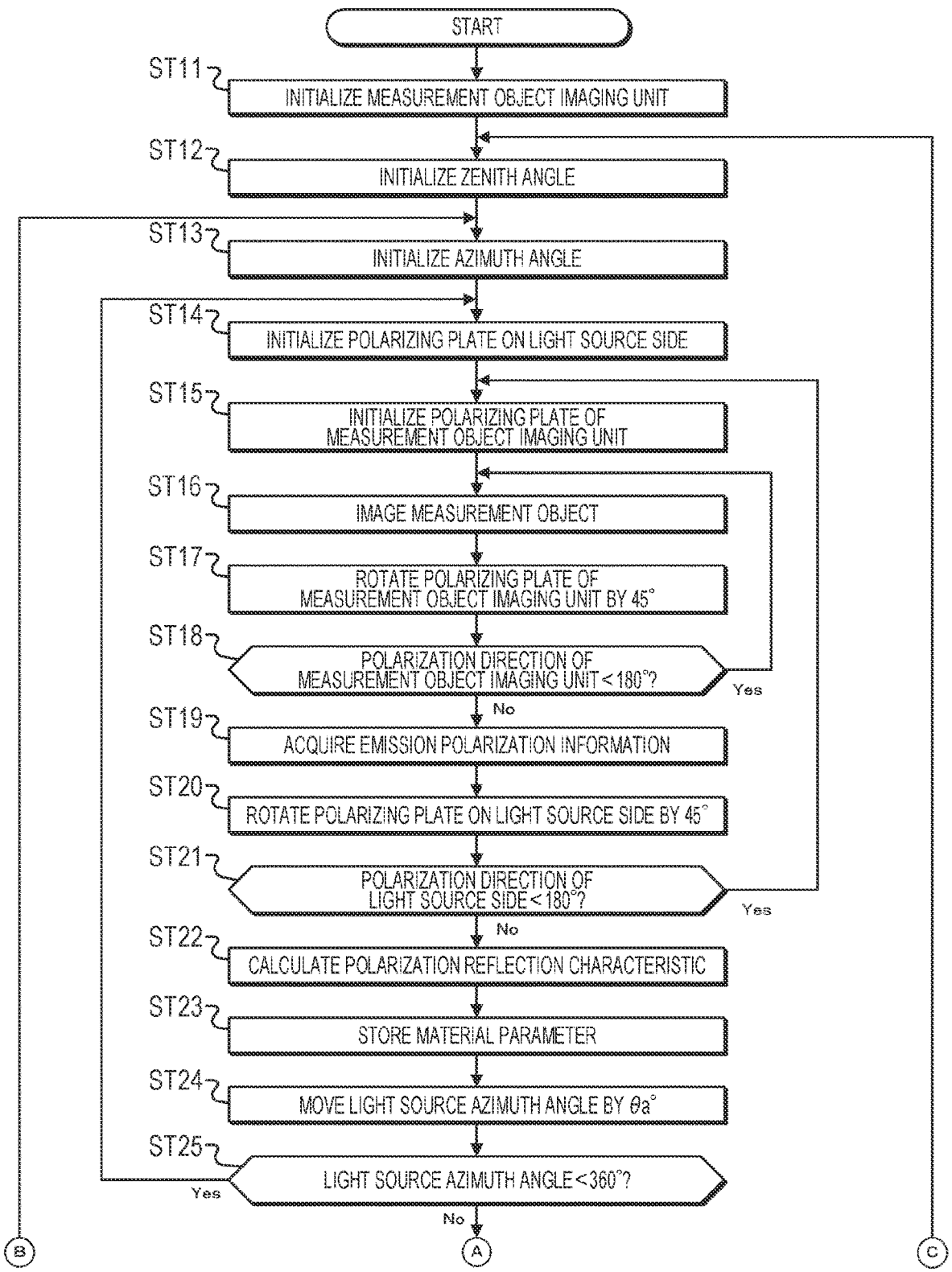
FIG. 10 is a flowchart (part 1) illustrating an operation of acquiring a material parameter.
Figure 11:
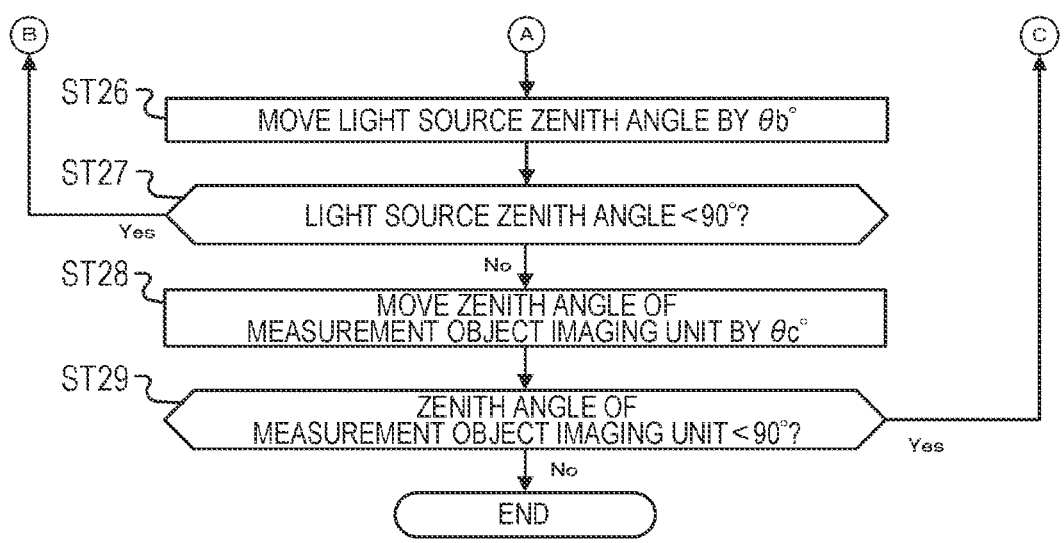
FIG. 11 is a flowchart (part 2) illustrating the operation of acquiring a material parameter.

FIGS. 10 and 11 are flowcharts illustrating an operation of acquiring the material parameter. Note that FIGS. 10 and 11 illustrate a case of using the light source parameter at each angle θa in the azimuth direction and at each angle θb in the zenith direction. Furthermore, in the measurement object imaging unit that images the measurement object of the material parameter, an imaging direction is moved in the zenith direction at each angle θc, and the polarization direction is switched at "0°, 45°, 90°, and 135°". Note that the light source parameter is measured in advance.

In step ST11, the material parameter acquisition unit initializes the measurement object imaging unit. The material parameter acquisition unit calibrates the measurement object imaging unit that images the measurement object of the material parameter, sets the azimuth angle and the zenith angle to 0°, and proceeds to step ST12.

In step ST12, the material parameter acquisition unit initializes the zenith angle. The material parameter acquisition unit sets the direction in which the zenith angle of the measurement object imaging unit is 0° to the direction in which the zenith angle of the imaging unit used to acquire the light source parameter (hereinafter referred to as "light source imaging unit") is 0°, and proceeds to step ST13.

In step ST13, the material parameter acquisition unit initializes the azimuth angle. The material parameter acquisition unit initializes the measurement object imaging unit, sets the direction in which the azimuth angle of the measurement object imaging unit is 0° to the direction in which the azimuth angle of the light source imaging unit is 0°, and proceeds to step ST14.

In step ST14, the material parameter acquisition unit initializes the polarizing plate on the light source side. The material parameter acquisition unit sets the polarization direction of the polarizing plate used in the light source imaging unit to 0°, and proceeds to step ST15.

In step ST15, the material parameter acquisition unit initializes the polarizing plate of the measurement object imaging unit. The material parameter acquisition unit sets the polarization direction of the polarizing plate used in the measurement object imaging unit to 0°, and proceeds to step ST16.

In step ST16, the material parameter acquisition unit images the measurement object of the material parameter. The measurement object imaging unit generates the polarized captured image by imaging the measurement object and proceeds to step ST17.

In step ST17, the material parameter acquisition unit rotates the polarizing plate of the measurement object imaging unit by 45°. The material parameter acquisition unit rotates the polarization direction of the polarizing plate by 45° and proceeds to step ST18.

In step ST18, the material parameter acquisition unit determines whether the polarization direction of the measurement object imaging unit is smaller than 180°. The material parameter acquisition unit returns to step ST16 in a case where the polarization direction after rotation is smaller than 180°, and proceeds to step ST19 in a case where the polarization direction after rotation is 180° or more.

In step ST19, the material parameter acquisition unit acquires an emission Stokes vector. The material parameter acquisition unit calculates the emission Stokes vector on the basis of the generated polarized captured image because each polarized captured image with the polarization direction of "0°, 45°, 90°, or 135°'" has been generated by performing the processing from step ST16 to step ST18, and proceeds to step ST20.

In step ST20, the material parameter acquisition unit rotates the polarizing plate on the light source side by 45°. The material parameter acquisition unit rotates the polarization direction of the polarizing plate by 45° and proceeds to step ST21.

In step ST21, the material parameter acquisition unit determines whether the polarization direction on the light source side is smaller than 180°. The material parameter acquisition unit returns to step ST15 in a case where the polarization direction after rotation is smaller than 180°, and proceeds to step ST22 in a case where the polarization direction after rotation is 180° or more.

In step ST22, the material parameter acquisition unit calculates the polarization reflection characteristic. The material parameter acquisition unit calculates the Muller matrix on the basis of the emission Stokes vectors of when the polarization direction of the polarized incident light on the measurement object is "0°, 45°, 90°, and 135°'". That is, the Muller matrix represented by Expression (9) or Expression (10) is calculated on the basis of Expressions (5) to (8) described above, and the processing proceeds to step ST23.

In step ST23, the material parameter acquisition unit stores the material parameter. The material parameter acquisition unit generates the material parameter in which the incident direction ωi indicating the light source direction and the emission direction ωo indicating the direction of the measurement object imaging unit are associated with the Muller matrix calculated in step ST22, stores the material parameter in a database unit or the like, and proceeds to step ST24.

In step ST24, the material parameter acquisition unit moves the light source azimuth angle by θa°. The material parameter acquisition unit moves the azimuth angle of the light source imaging unit by θa° and proceeds to step ST25.

In step ST25, the material parameter acquisition unit determines whether the light source azimuth angle is smaller than 360°. The material parameter acquisition unit returns to step ST14 in a case where the light source azimuth angle is smaller than 360°, and proceeds to step ST26 in a case where the light source azimuth angle is 360° or more.

In step ST26, the material parameter acquisition unit moves the light source zenith angle by θb°. The material parameter acquisition unit moves the zenith angle of the light source imaging unit by θb° and proceeds to step ST27.

In step ST27, the material parameter acquisition unit determines whether the light source zenith angle is smaller than 90°. The material parameter acquisition unit returns to step ST13 in a case where the light source zenith angle is smaller than 90°, and proceeds to step ST28 in a case where the light source azimuth angle is 90° or more. That is, by performing the processing from step ST13 to step ST27, the material parameter for each incident direction in which the resolution in the azimuth direction is θa° and the resolution in the zenith direction is θb° is stored in the database unit or the like for one emission direction.

In step ST28, the material parameter acquisition unit moves the zenith angle of the measurement object imaging unit by θc°. The material parameter acquisition unit moves the zenith angle of the measurement object imaging unit by θc° and proceeds to step ST29.

In step ST29, the material parameter acquisition unit determines whether the zenith angle of the measurement object imaging unit is smaller than 90°. The material parameter acquisition unit returns to step ST12 in a case where the zenith angle of the measurement object imaging unit is smaller than 90°, and terminates the processing in a case where the azimuth angle is 90° or more. Therefore, the material parameters for each incident direction in which the resolution in the azimuth direction is the angle θa and the resolution in the zenith direction is the angle θb, and for each emission direction in which the resolution in the zenith direction is the angle θc, are stored in the database unit or the like.

3-4. Acquisition of Camera Parameter

Next, acquisition of the camera parameter will be described. An existing measurement method is only required to be used as the camera parameter. For example, the internal parameters and the external parameters are acquired using the method disclosed in Japanese Patent Application Laid-Open No. 2001-264037, Japanese Patent Application Laid-Open No. 2008-131176, or the like.

3-5. Optimization Processing of Image Difference and Parameters

Next, the optimization processing of image difference and parameters will be described. The abnormality detection unit 50 calculates a difference $E_{I\varphi}$ (L, G, M, C) between the polarized rendered image $I^f_\varphi$ and the polarized captured image $I^r_\varphi$. For example, as the difference E1 (L, G, M, C), the abnormality detection unit 50 may calculate a mean square error (MSE) as represented by Expression (11) or may calculate the difference by using an arbitrary norm function as represented by Expression (12). Furthermore, a peak signal to noise ratio (PSNR) calculated using a maximum pixel value that can be taken by the image and the mean square error may be used as the difference.

[Math. 7]

$$E_{I_\varphi}(L, G, M, C) = \frac{1}{N}\|I^f_\varphi - I^r_\varphi\|_2 = \frac{1}{N}\sqrt{\sum_{j=1}^{N}|I^f_\varphi(j) - I^r_\varphi(j)|^2} \quad (11)$$

$$E_{I_\varphi}(L, G, M, C) = \|I^f_\varphi - I^r_\varphi\|_n = \sqrt[n]{\sum_{j=1}^{N}|I^f_\varphi(j) - I^r_\varphi(j)|^n} \quad (12)$$

In a case where the parameter used to generate the polarized rendered image $I^f_\varphi$ coincides with the parameter at the time of acquiring the polarized captured image $I^r_\varphi$, the difference $E_{I\varphi}$ (L, G, M, C)=0. Therefore, the polarization rendering setting unit 30 performs the optimization processing for the parameter, using the difference $E_{I\varphi}$ (L, G, M, C) such that the parameter used for generating the polarized rendered image $I^f_\varphi$ coincides with the parameter at the time of acquiring the polarized captured image I. For example, the polarization rendering setting unit 30 calculates a partial differential for each parameter of the difference $E_{I\varphi}$ (L, G, M, C) that is a multivariable function, and calculates parameters $L_{em}$, $G_{em}$, $M_{em}$, $C_{em}$ that can minimize the difference $E_{I\varphi}$ (L, G, M, C) as represented by Expression (13), using an existing optimization method (steepest descent method or the like).

[Math. 8]

$$L_{em}, G_{em}, M_{em}, C_{em} = \underset{L,G,M,C}{\mathrm{argmin}} E_{I_\varphi}(L, G, M, C) \quad (13)$$

The polarization rendering setting unit 30 causes the light source parameter L to converge to an optimum value by repeating the calculation of Expression (14). Furthermore, the polarization rendering setting unit 30 causes the geometry parameter G to converge to the optimum value by repeating the calculation of Expression (15), and causes the material parameter M to converge to the optimum value by repeating the calculation of Expression (16). Moreover, the polarization rendering setting unit 30 causes the camera parameter C to converge to the optimum value by repeating the calculation of Expression (17). The update rates $\alpha_L$, $\alpha_G$, $\alpha_M$, and $\alpha_C$ used in Expressions (14) to (17) are parameters for adjusting the correction amounts when causing the parameters to converge using the calculation result of the partial differentiation. The update rate may be set in advance, or the update rate may be changeable so that the time required for convergence or the like can be adjusted. Furthermore, the partial differentiation operation may be automatically performed using a method called automatic differentiation, or may be manually performed by a user.

[Math. 9]

$$L_{em} = L_{em} - \alpha_L \frac{\partial E_{I_\varphi}}{\partial L} \quad (14)$$

$$G_{em} = G_{em} - \alpha_G \frac{\partial E_{I_\varphi}}{\partial G} \quad (15)$$

$$M_{em} = M_{em} - \alpha_M \frac{\partial E_{I_\varphi}}{\partial M} \quad (16)$$

$$C_{em} = C_{em} - \alpha_L \frac{\partial E_{I_\varphi}}{\partial C} \quad (17)$$

By performing such processing, the abnormality detection unit 50 can calculate the difference between images. Furthermore, the polarization rendering setting unit 30 can set each parameter necessary for generating the polarized rendered image by performing the optimization processing for a parameter that is not measured in advance or on site where abnormality detection is performed.

3-6. Abnormality Detection

Next, abnormality detection will be described. In a case where the polarized rendered image $I^f_\varphi$ and the polarized captured image $I^r_\varphi$ coincide with each other, the difference $E_{I_\varphi}$ (L, G, M, C) is "0". Furthermore, in a case where the parameters to be used for rendering are not clear, it is possible to approach an imaging environment and an imaging condition of when the polarized captured image $I^r_\varphi$ has been acquired by performing the parameter optimization processing.

Therefore, the abnormality detection unit 50 calculates the difference between the polarized rendered image $I^f_\varphi$ generated using the parameter measured in advance, the parameter measured on site where abnormality detection is performed, and the parameter calculated by the optimization processing, and the polarized captured image $I^r_\varphi$ in units of pixels, and determines the pixel region in which the difference $E_{I_\varphi}$ (L, G, M, C) is smaller than a determination threshold Jth as the normal region, and the pixel region in which the difference $E_{I_\varphi}$ (L, G, M, C) is equal to or larger than the determination threshold Jth as the abnormal region.

In this manner, by comparing the difference $E_{I_\varphi}$ (L, G, M, C) with the determination threshold Jth, the abnormality detection unit 50 can detect the abnormal region generated in the abnormality detection target on the basis of the polarization characteristic.

Furthermore, the abnormality detection unit 50 may estimate the cause of the detected abnormality on the basis of the parameter attribute information indicating whether the parameter is a parameter measured in advance or a parameter calculated in the optimization processing. For example, in a case where the material parameter M is measured in advance and fixed by the polarization rendering setting unit 30, and the other parameters are automatically estimated by the optimization processing, the cause of the detection of the abnormal region may be estimated as an abnormality of a material polarization characteristic corresponding to the material parameter M measured and fixed in advance.

Moreover, the abnormality detection unit 50 may calculate the polarization information (for example, a polarization degree, polarization phase, normal line, or the like) from each of the polarized rendered image $I^f_\varphi$ and the polarized captured image $I^r_\varphi$ and output the difference in the polarization information. By outputting the difference in the polarization information in this manner, the user can easily determine the abnormal region on the basis of the polarization information even in a case where it is difficult to determine the abnormality with the luminance information or the color information. Note that the calculation of the polarization information such as the polarization degree, the polarization phase, or the normal may be performed by, for example, a method disclosed in WO 2019/116708 A, or the like.

By detecting the abnormal region using the polarization information in this manner, it is possible to accurately detect the abnormal region that is difficult to visually distinguish.

4. Operation Example of Embodiment

Next, an operation example of the embodiment will be described. In the information processing device 10, the polarization rendering setting unit 30 fixes each parameter to the parameter measured in advance, in a case where the material parameter M of the abnormality detection target is measured in advance, the imaging environment and the imaging condition of the abnormality detection target are set to a state specified in advance, and the light source parameter L, the geometry parameter G, and the camera parameter C are measured in advance.

The polarized rendered image generation unit 40 generates the polarized rendered image $I^f_\varphi$ using the parameters fixed by the polarization rendering setting unit 30. The abnormality detection unit 50 calculates the difference $E_{I_\varphi}$ (L, G, M, C) between the polarized rendered image $I^f_\varphi$ generated by the polarization rendering setting unit 30 and the polarized captured image $I^r_\varphi$ acquired by the polarized captured image acquisition unit 20 in units of pixels and compares the difference $E_{I_\varphi}$ (L, G, M, C) with the determination threshold Jth, thereby detecting the abnormal region of the abnormality detection target.

By performing such processing, the abnormal region of the abnormality detection target can be detected on the basis of the polarization characteristic.

Incidentally, the light source parameter L, the geometry parameter G, the material parameter M, and the camera parameter C are not limited to those measured in advance. For example, in a case where the polarized captured image $I^r_\varphi$ is acquired in a state where the imaging environment and the imaging condition are different, the abnormal region cannot be detected on the basis of the difference $E_{I_\varphi}$ (L, G, M, C) unless the polarized rendered image $I^r_\varphi$ is generated using parameters corresponding to the imaging environment and the imaging condition when the polarized captured image $I^r_\varphi$ has been acquired. In this case, for the parameter that cannot be measured in advance, generation of the polarized rendered image $I^r_\varphi$ and calculation of the difference $E_{I\varphi}$ (L, G, M, C) are performed using a parameter value that is an initial value, and the parameter value is updated using the calculated difference $E_{I\varphi}$ (L, G, M, C). Furthermore, generation of the polarized rendered image $I^r_\varphi$ and calculation of the difference $E_{I\varphi}$ (L, G, M, C) are performed using the updated parameter value, and the parameter is optimized by repeating processing of updating the parameter value using the calculated difference $E_{I\varphi}$ (L, G, M, C). Moreover, the difference $E_{I\varphi}$ (L, G, M, C) between the polarized rendered image $I^r_\varphi$ generated using the optimized parameters and the polarized captured image $I^r_\varphi$ acquired by the polarized captured image acquisition unit 20 in units of pixels, and is compared with the determination threshold Jth, so that the abnormal region in the abnormality detection target is detected.

By performing such processing, the abnormal region of the abnormality detection target can be detected even in a case where each parameter to be used for generating the polarized rendered image $I^r_\varphi$ cannot be measured in advance.

FIG. 12 illustrates operation examples. Note that operation examples illustrated in FIG. 12 illustrate cases where an abnormality of a surface coating state is detected for each abnormality detection target in a manufacturing line or the like, for example.

Case 1 illustrates a case of including abnormality detection targets having different shapes and detecting an abnormality of a surface coating state for each abnormality detection target. In this case, the material parameter M of the abnormality detection target is measured in advance. Furthermore, since the light source parameter L, the geometry parameter G, and the camera parameter C are fixed parameters according to the imaging environment and the imaging condition when acquiring the polarized captured image of the abnormality detection target on a line, the light source parameter L, the geometry parameter G, and the camera parameter C are acquired on site. By setting the parameters in this manner, it is possible to detect the abnormal region in the surface coating state on the basis of the difference between the generated polarized rendered image and the acquired polarized captured image.

Case 2 illustrates a case of detecting an abnormality of a surface coating state for each of abnormality detection targets having the same shape and different postures. In this case, the material parameter M of the abnormality detection target is measured in advance. Furthermore, since the light source parameter L and the camera parameter C are fixed parameters according to the imaging environment and the imaging condition when acquiring the polarized captured image of the abnormality detection target on a line, the light source parameter L and the camera parameter C are acquired on site. Moreover, since the postures of the abnormality detection targets are different, the geometry parameter G is automatically set by the optimization processing. By setting the parameters in this manner, it is possible to detect the abnormal region in the surface coating state on the basis of the difference between the generated polarized rendered image and the acquired polarized captured image.

Case 3 illustrates a case of detecting an abnormality of a surface coating state for each of abnormality detection targets having the same shape and posture without obtaining information regarding the polarized captured image acquisition unit. In this case, the material parameter M of the abnormality detection target is measured in advance. Furthermore, since the light source parameter L and the geometry parameter G are fixed parameters according to the imaging environment and the imaging condition when acquiring the polarized captured image of the abnormality detection target on a line, the light source parameter L and the geometry parameter G are acquired on site. Moreover, since the information regarding the polarized captured image acquisition unit cannot be obtained, the camera parameter C is automatically set by the optimization processing. By setting the parameters in this manner, it is possible to detect the abnormal region in the surface coating state on the basis of the difference between the generated polarized rendered image and the acquired polarized captured image.

Case 4 illustrates a case of detecting an abnormality of a surface coating state for each of abnormality detection targets having the same shape and posture without obtaining information regarding the light source. In this case, the material parameter M of the abnormality detection target is measured in advance. Furthermore, since the geometry parameter G and the camera parameter C are fixed parameters according to the imaging environment and the imaging condition when acquiring the polarized captured image of the abnormality detection target on a line, the geometry parameter G and the camera parameter C are acquired on site. Moreover, since the information regarding the light source cannot be obtained, the light source parameter L is automatically set by the optimization processing. By setting the parameters in this manner, it is possible to detect the abnormal region in the surface coating state on the basis of the difference between the generated polarized rendered image and the acquired polarized captured image.

Case 5 illustrates a case of detecting an abnormality of a surface coating state for each of abnormality detection targets having the same shape without obtaining information regarding the posture and the light source. In this case, the material parameter M of the abnormality detection target is measured in advance. Furthermore, since the camera parameter C is the fixed parameter according to the imaging environment and the imaging condition when acquiring the polarized captured image of the abnormality detection target on a line, the camera parameter C is acquired on site. Moreover, since the information regarding the posture and the light source cannot be obtained, the light source parameter L and the geometry parameter G are automatically set by the optimization processing. By setting the parameters in this manner, it is possible to detect the abnormal region in the surface coating state on the basis of the difference between the generated polarized rendered image and the acquired polarized captured image.

Case 6 illustrates a case of detecting an abnormality of a surface coating state for each of abnormality detection targets having the same shape and posture without obtaining information regarding the light source and the polarized captured image acquisition unit. In this case, the material parameter M of the abnormality detection target is measured in advance. Furthermore, since the geometry parameter G is the fixed parameter according to the imaging environment and the imaging condition when acquiring the polarized captured image of the abnormality detection target on a line, the geometry parameter G is acquired on site. Moreover, since the information regarding the light source and the polarized captured image acquisition unit cannot be obtained, the light source parameter L and the camera parameter C are automatically set by the optimization processing. By setting the parameters in this manner, it is possible to detect the abnormal region in the surface coating state on the basis of the difference between the generated polarized rendered image and the acquired polarized captured image.

Case 7 illustrates a case of detecting an abnormality of a surface coating state for each of abnormality detection targets having the same shape without obtaining information regarding the light source, the polarized captured image acquisition unit and the posture. In this case, the material parameter M of the abnormality detection target is measured in advance. Moreover, since the information regarding the light source, the polarized captured image acquisition unit, and the posture cannot be obtained, the light source parameter L, the geometry parameter G, and the camera parameter C are automatically set by the optimization processing. By setting the parameters in this manner, it is possible to detect the abnormal region in the surface coating state on the basis of the difference between the generated polarized rendered image and the acquired polarized captured image.

Note that FIG. 12 illustrates examples, and the operation is not limited to the cases illustrated in FIG. 12. For example, a rotten portion may be detected from a surface state of a fruit.

The series of processing described in the description can be executed by hardware, software, or a combined configuration of the hardware and software. In the case of executing the processing by software, a program, in which the processing sequence is recorded, is installed in a memory of a computer incorporated in dedicated hardware and executed by the computer. Alternatively, the program can be installed and executed in a general-purpose computer capable of executing various types of processing.

For example, the program can be recorded in advance in a hard disk, a solid state drive (SSD), or a read only memory (ROM) as a recording medium. Alternatively, the program can be temporarily or permanently stored (recorded) on a removable recording medium such as a flexible disk, a compact disc read only memory (CD-ROM), a magneto optical (MO) disk, a digital versatile disc (DVD), a Blu-Ray Disc (BD (registered trademark)), a magnetic disk, a semiconductor memory card. Such a removable recording medium can be provided as so-called package software.

Furthermore, the program can be installed from a removable recording medium to a computer, or may also be transferred in a wireless or wired manner to a computer via a network such as a local area network (LAN) or the Internet. The computer can receive the program thus transferred and install the program in a recording medium such as a built-in hard disk.

Note that the effects described in the present description are merely examples and are not limited, and additional undescribed effects may be exhibited. Furthermore, the present technology should not be construed as being limited to the above-described embodiments of the technology. The embodiment of this technology discloses the present technology in the form of exemplification, and it is obvious that a person skilled in the art can modify or substitute the embodiment without departing from the scope of the present technology. In other words, to judge the gist of present technology, the scope of claims should be taken into consideration.

Furthermore, the information processing device of the present technology can have the following configurations.

(1) An information processing device including:
a polarization rendering setting unit configured to set a plurality of parameters to be used for generating a polarized rendered image of an abnormality detection target;
a polarized rendered image generation unit configured to generate the polarized rendered image of the abnormality detection target on the basis of the parameters set by the polarization rendering setting unit; and
an abnormality detection unit configured to detect an abnormal region of the abnormality detection target on the basis of a difference between a polarized captured image acquired by imaging the abnormality detection target and the polarized rendered image generated by the polarized rendered image generation unit.

(2) The information processing device according to (1), in which
the plurality of parameters is measured, and
the polarization rendering setting unit sets the plurality of measured parameters as the parameters to be used for generating the polarized rendered image.

(3) The information processing device according to (1), in which,
in a case where some or all of the plurality of parameters are not measured,
the polarization rendering setting unit performs optimization processing for each of the unmeasured parameters, and sets a measured parameter and the parameter calculated by the optimization processing, or the parameter calculated by the optimization processing in a case where there is no measured parameter, as the parameters to be used for generating the polarized rendered image.

(4) The information processing device according to (3), in which, in the optimization processing for the parameters, a parameter capable of minimizing the difference between the polarized captured image and the polarized rendered image generated by the polarized rendered image generation unit is calculated.

(5) The information processing device according to (4), in which the polarization rendering setting unit enables adjustment of a convergence characteristic of the parameter by using a parameter value that has converged by repeating update of the parameter using the difference as an optimized parameter value.

(6) The information processing device according to (3) or (5), in which the abnormality detection unit estimates an abnormality cause of the detected abnormal region on the basis of information indicating whether the parameter is the measured parameter or the parameter calculated by the optimization processing.

(7) The information processing device according to any one of (1) to (6), in which the abnormality detection unit detects the abnormal region of the abnormality detection target on the basis of a difference in polarization information by using the polarization information calculated from the polarized captured image and the polarization information calculated from the polarized rendered image.

(8) The information processing device according to any one of (1) to (7), in which the abnormality detection unit detects the abnormal region of the abnormality detection target in units of pixels.

(9) The information processing device according to any one of (1) to (8), in which the plurality of parameters includes a light source parameter related to a light source, a geometry parameter related to the abnormality detection target, a material parameter related to a polarization characteristic of the abnormality detection target, and a camera parameter of a polarized captured image acquisition unit that acquires the polarized captured image.

(10) The information processing device according to (9), in which at least the material parameter is measured in advance, and the polarization rendering setting unit uses the parameter measured in advance in a fixed manner.

REFERENCE SIGNS LIST

10 Information processing device
20 Polarized captured image acquisition unit
30 Polarization rendering setting unit
31 Light source parameter setting unit
32 Geometry parameter setting unit
33 Material parameter setting unit
34 Camera parameter setting unit
40 Polarized rendered image generation unit
50 Abnormality detection unit

The invention claimed is:

1. An information processing device, comprising:
 circuitry configured to:
  acquire a polarized captured image of an abnormality detection target based on an imaging operation;
  set a plurality of parameters that is used to generate a polarized rendered image of the abnormality detection target,
   wherein the plurality of parameters includes a light source parameter related to a light source, a geometry parameter related to the abnormality detection target, a material parameter related to a polarization characteristic of the abnormality detection target, and a camera parameter associated with the acquisition of the polarized captured image;
  generate the polarized rendered image of the abnormality detection target based on the plurality of parameters; and
  detect an abnormal region of the abnormality detection target based on a difference between the acquired polarized captured image and the generated polarized rendered image.

2. The information processing device according to claim 1, wherein
 the plurality of parameters is measured, and
 the circuitry is further configured to
  set the plurality of parameters that is measured as the plurality of parameters that is used to generate the polarized rendered image.

3. The information processing device according to claim 1, wherein
 in a case where at least one parameter of the plurality of parameters is unmeasured, the circuitry is further configured to:
  perform an optimization process for each of the unmeasured at least one parameter of the plurality of parameters;
  calculate a parameter based on the performed optimization process; and
  set, as the plurality of parameters that is used to generate the polarized rendered image, one of:
   a measured parameter of the plurality of parameters and the parameter calculated based on the performed optimization process, or
   the parameter calculated based on the performed optimization process in a case where there is no measured parameter.

4. The information processing device according to claim 3, wherein the circuitry is further configured to
 calculate, based on the performed optimization process, the parameter to minimize the difference between the acquired polarized captured image and the generated polarized rendered image.

5. The information processing device according to claim 4, wherein
 the circuitry is further configured to enable an adjustment of a convergence characteristic of the parameter based on a parameter value,
 the parameter value has converged based on a repeated update of the parameter, and
 the repeated update of the parameter is based on the difference as an optimized parameter value.

6. The information processing device according to claim 3, wherein
 the circuitry is further configured to estimate an abnormality cause of the detected abnormal region based on information indicating whether the plurality of parameters is one of the measured parameter or the parameter calculated based on the performed optimization process.

7. The information processing device according to claim 1, wherein the circuitry is further configured to:
 determine a difference in polarization information based on polarization information calculated from the polarized captured image and polarization information calculated from the polarized rendered image; and
 detect the abnormal region of the abnormality detection target based on the determined difference in the polarization information.

8. The information processing device according to claim 1, wherein
 the circuitry is further configured to detect the abnormal region of the abnormality detection target in units of pixels.

9. The information processing device according to claim 1, wherein the circuitry is further configured to:
 measure the material parameter in advance; and
 use the material parameter measured in advance in a fixed manner.

10. An information processing method, comprising:
 acquiring a polarized captured image of an abnormality detection target based on an imaging operation;
 setting a plurality of parameters that is used for generating a polarized rendered image of the abnormality detection target,
  wherein the plurality of parameters includes a light source parameter related to a light source, a geometry parameter related to the abnormality detection target, a material parameter related to a polarization characteristic of the abnormality detection target, and a camera parameter associated with the acquisition of the polarized captured image;
 generating the polarized rendered image of the abnormality detection target based on the plurality of parameters; and
 detecting an abnormal region of the abnormality detection target based on a difference between the acquired polarized captured image and the generated polarized rendered image.

11. A non-transitory computer-readable medium having stored thereon computer-executable instructions that, when executed by a computer, cause the computer to execute operations, the operations comprising:
 acquiring a polarized captured image of an abnormality detection target based on an imaging operation;

setting a plurality of parameters that is used for generating a polarized rendered image of the abnormality detection target,
  wherein the plurality of parameters includes a light source parameter related to a light source, a geometry parameter related to the abnormality detection target, a material parameter related to a polarization characteristic of the abnormality detection target, and a camera parameter associated with the acquisition of the polarized captured image;
generating the polarized rendered image of the abnormality detection target based on the plurality of parameters; and
detecting an abnormal region of the abnormality detection target based on a difference between the acquired polarized captured image and the generated polarized rendered image.

12. An information processing device, comprising:
circuitry configured to:
  acquire a polarized captured image of an abnormality detection target based on an imaging operation;
  obtain a plurality of parameters that is used to generate a polarized rendered image of the abnormality detection target;
  perform, in a case where some or all of the plurality of parameters are unmeasured, an optimization process for each of the some or all of the plurality of parameters that are unmeasured;
  calculate a parameter based on the performed optimization process;
  set, as the plurality of parameters that is used to generate the polarized rendered image, one of:
    a measured parameter of the plurality of parameters and the parameter calculated based on the performed optimization process, or
    the parameter calculated based on the performed optimization process, in a case where there is no measured parameter;
  generate the polarized rendered image of the abnormality detection target based on the plurality of parameters; and
  detect an abnormal region of the abnormality detection target based on a difference between the acquired polarized captured image and the generated polarized rendered image.

* * * * *